(12) United States Patent
Bertet et al.

(10) Patent No.: US 8,316,737 B2
(45) Date of Patent: Nov. 27, 2012

(54) ELECTRIC CLAMPING DEVICE FOR AN ADJUSTABLE MOTOR VEHICLE STEERING COLUMN

(75) Inventors: Nicolas Bertet, Vendôme (FR); Vincent Eymery, Lancé (FR)

(73) Assignee: ZF Systems de Direction Nacam, S.A.S., Vendome (FR)

( * ) Notice: Subject to any disclaimer, the term of this patent is extended or adjusted under 35 U.S.C. 154(b) by 382 days.

(21) Appl. No.: 12/663,023

(22) PCT Filed: Mar. 26, 2008

(86) PCT No.: PCT/FR2008/050527
§ 371 (c)(1),
(2), (4) Date: Dec. 4, 2009

(87) PCT Pub. No.: WO2008/152253
PCT Pub. Date: Dec. 18, 2008

(65) Prior Publication Data
US 2010/0170364 A1    Jul. 8, 2010

(30) Foreign Application Priority Data
Jun. 12, 2007 (FR) ...................................... 07 04229

(51) Int. Cl.
*B62D 1/16* (2006.01)
(52) U.S. Cl. ......................................................... 74/495
(58) Field of Classification Search .................... 74/492, 74/493, 495; 70/252; 192/219; 280/89.11
See application file for complete search history.

(56) References Cited

U.S. PATENT DOCUMENTS

| 2,761,326 | A | * | 9/1956 | Herbenar et al. .......... 74/388 PS |
| 3,403,668 | A | * | 10/1968 | Schottler ..................... 123/197.2 |
| 5,088,767 | A | * | 2/1992 | Hoblingre et al. ............. 280/775 |
| 5,377,555 | A | * | 1/1995 | Hancock .......................... 74/493 |
| 2002/0083784 | A1 | * | 7/2002 | Brauer et al. ...................... 74/57 |
| 2003/0221505 | A1 | | 12/2003 | Schick |
| 2004/0000779 | A1 | * | 1/2004 | Armstrong et al. ............ 280/775 |
| 2007/0234845 | A1 | * | 10/2007 | Gist et al. ......................... 74/569 |

FOREIGN PATENT DOCUMENTS

| EP | 1375296 | 1/2004 |
| WO | 2004069629 | 8/2004 |
| WO | 2007039197 | 4/2007 |

* cited by examiner

*Primary Examiner* — Vicky Johnson
(74) *Attorney, Agent, or Firm* — Lawrence E. Laubscher, Sr.; Lawrence E. Laubscher, Jr.

(57) ABSTRACT

An adjustable steering column adjustable includes a steering shaft mounted in a body tube arranged in a movable support member and immobilized on a fixed support member by an electric clamping system. The clamping system is mounted in a casing supporting an electric actuator and includes a transmission mechanism, an immobilizing assembly and a clamping rod passing through the fixed support member. The immobilizing assembly includes a fixed cam rotationally fixed with respect to the clamping rod, and a rotationally movable cam, the cams having rolling paths for balls. Each rolling path has the shape of a spiral with an escape slope for a ball, in order to initiate clamping or unclamping depending on the rotation direction of the movable cam relative to the fixed cam.

19 Claims, 6 Drawing Sheets

ELECTRIC CLAMPING DEVICE FOR AN ADJUSTABLE MOTOR VEHICLE STEERING COLUMN

CROSS REFERENCE TO RELATED APPLICATIONS

The present application is a continuation of the PCT International Application No. PCT/FR2008/050527 filed Mar. 26, 2008, which claims priority from FR Application Number 0704229 filed Jun. 12, 2007, the disclosures of which are hereby incorporated by reference herein in their entireties.

BACKGROUND OF THE INVENTION

1. Field of the Invention

The present invention relates to an electric clamping device mounted on a steering column of an automotive vehicle.

2. Description of Related Art

The device according to the invention is applicable to a steering column whose depth and height is adjustable, or to a steering column whose depth or height is adjustable, and whose steering shaft is mounted in a body tube, which is carried and immobilized onto the structure of the vehicle in the required position. Thus, the steering column includes a steering shaft rotatably mounted into the body tube, which is linked to a support assembly fastened to the vehicle chassis or to a member of the vehicle body.

Most adjustable steering columns of automotive vehicles are provided with an operating lever, the rotation of which in one direction or in the other allows to reach the locked position and the unlocked position of the steering column. Such known devices have the disadvantages of having a hazardous volume as a result of the presence of a control handle, having a limited rotation clearance, generating a relatively weak clamping and unclamping stroke. Moreover, such control handle is generally located in the area of the driver's knee in the event of an impact.

SUMMARY OF THE INVENTION

The object of the present invention is to provide an electric clamping device for a body tube of a steering column, which does not have the above-described drawbacks, i.e. the electric clamping device of this invention allows to reach the desired clamping and unclamping stroke, while having a relatively reduced clearance that does not involve any risk to the driver in the event of an impact.

This invention relates to an electric clamping device for a steering column adjustable in depth and/or in height of an automotive vehicle, that includes a steering shaft rotatably mounted about a steering axis in a body tube. Said steering column is mounted in a support assembly including a fixed support member made up of two uprights and a connecting member, and a movable support member. Said body tube is arranged in the movable support member and immobilized on the fixed support member, in a locked position, by a clamping system along a clamping axis substantially perpendicular to the vertical steering plane passing through the steering axis. Said clamping system has a clamping rod, whose axis is the clamping axis and which passes through the two uprights of the fixed support member.

Said electric clamping device includes an immobilizing assembly, located in the clamping system and mounted on the clamping rod, which includes a fixed cam rotationally fixed with respect to the clamping axis, a rotationally movable cam and at least one rolling member arranged between the fixed cam and the movable cam.

The rolling member or each rolling member moves on a fixed rolling path arranged on the fixed cam, and on a movable rolling path arranged on the movable cam. Each rolling path has an escape slope for the rolling member with respect to the corresponding cam so that while rotating the movable cam with respect to the fixed cam, the two cams move apart or closer one relative to the other according to the rotation direction, so as to reach the locked or unlocked position of the steering column.

Said escape slope of the rolling paths has a varying value less than the value linked to the friction coefficient for the rolling member. Each rolling path is a curve having a radius varying with respect to the clamping axis, so that while rotating the movable cam with respect to the fixed cam, one or more rolling paths never interfere with itself or with the other rolling paths; the axial movement of the movable cam with respect to the fixed cam is a function of the rotation of the movable cam and depends, at every moment, on the position of the rolling member or rolling members with respect to the clamping axis and on the escape slope of the rolling paths for said position.

Advantageously, the immobilizing assembly can include two or three rolling members, each rolling member moving on corresponding fixed rolling path and movable rolling path.

The rolling member or the rolling members are maintained in place by a cage and are preferably balls. Moreover, a damping member is arranged in a housing arranged at the peripheral end of each of the fixed rolling paths and each of the movable rolling paths.

According to this invention, said electric clamping device is mounted in a casing supporting an electric actuator, and including: a transmission mechanism, the immobilizing assembly and the clamping rod passing through the two uprights of the fixed support member. The electric actuator is an electric motor, the axis of which is located in a plane perpendicular to the clamping axis and parallel to the vertical steering plane.

The transmission mechanism includes a wheel and an endless screw mounted in the casing, the endless screw being driven by the electric motor and meshing into the wheel integral with the movable cam mounted on the clamping rod. The shaft of the electric motor driving the endless screw is supported at the end thereof by a self-lubricating bearing arranged in the casing. Moreover, the casing contains a plastic abutment arranged at the end of the driving shaft.

The immobilizing assembly includes the movable cam, the cage and the fixed cam that are arranged within the casing and that are mounted on the clamping rod, the wheel being mounted on a hub of the movable cam and rotationally integral with the hub by a flat portion arrangement. The clamping rod is supported at its end by a self-lubricating bearing arranged in the casing. An abutment with needles is provided on the end of the clamping rod, said needle abutment resting against an external face of the casing, and being maintained in place by an axial holding member made up of a head arranged on the clamping rod. Finally, a return spring is mounted on the clamping rod between the fixed cam and the movable support member in order to ensure that the device is under constraint.

Thus, the clamping system includes the clamping rod on which there are mounted the needle abutment, the immobilizing assembly, the return spring and an axial holding member. The needle abutment is arranged between the clamping rod head and the casing. The immobilizing assembly is arranged in the casing and against the external face of an upright of the fixed support member. The return spring is arranged between the fixed cam of the immobilizing assembly and the movable support member. The axial holding member is made of a nut mounted on the threaded end of the clamping rod, and rests against the external face of the other upright of the fixed support member. The clamping rod has two flat portions cooperating with the width of the oblong hole provided in said upright for the height adjustment.

In order to hold the steering column in position, the fixed cam includes two in-height movable radial racks and two fixed axial racks. The two movable radial racks cooperate with two fixed radial racks arranged on the uprights of a frame housed in the upright of the fixed support member. The two fixed axial racks cooperate with two movable axial racks arranged on an upright of the movable support member. The two movable radial racks are arranged in the bottom of two notches of the fixed cam that accommodate the two uprights of the frame; and a plastic pad is fixed in said frame for making sliding easier.

Thus, the electric clamping device for a steering column of an automotive vehicle according to the invention has the advantage of achieving a much bigger clamping and unclamping stroke depending on the control rotation that can be much higher than in the known systems and this while guarantying a rolling of the rolling members with no sliding. Moreover, the device of this invention makes it possible to completely release the impact area with the knee should an impact occur. Finally, the electric clamping device of this invention can be mounted in a similar volume of an existing automotive vehicle.

BRIEF DESCRIPTION OF THE DRAWING

Further features and advantages of the present invention will become more clearly apparent on reading the following description of several preferred embodiments of the invention, given by way of nonlimiting examples, with reference to the corresponding appended drawings, in which.

DETAILED DESCRIPTION

As can be seen on FIGS. 1, 2, 3 and 4, the invention relates to an electric clamping device for a steering column of an automotive vehicle. The electric clamping device according to this invention meets the current requirements for automotive vehicles. The steering column is adjustable in either depth or height, or both in depth and in height.

Figure 1:
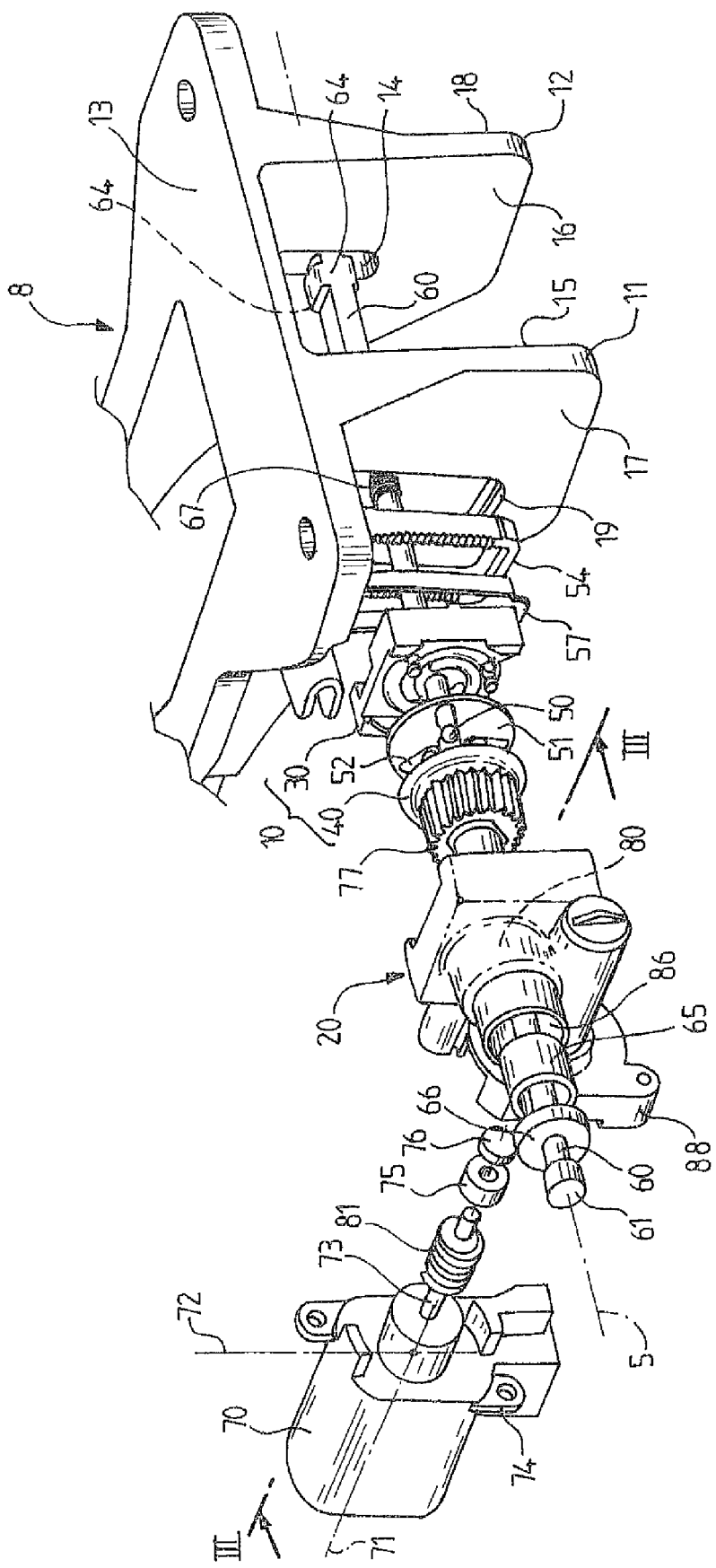
FIG. 1 is an exploded perspective view of different members of the electric clamping device according to the invention for a steering column, the fixed support member of which is only shown.
Figure 2:
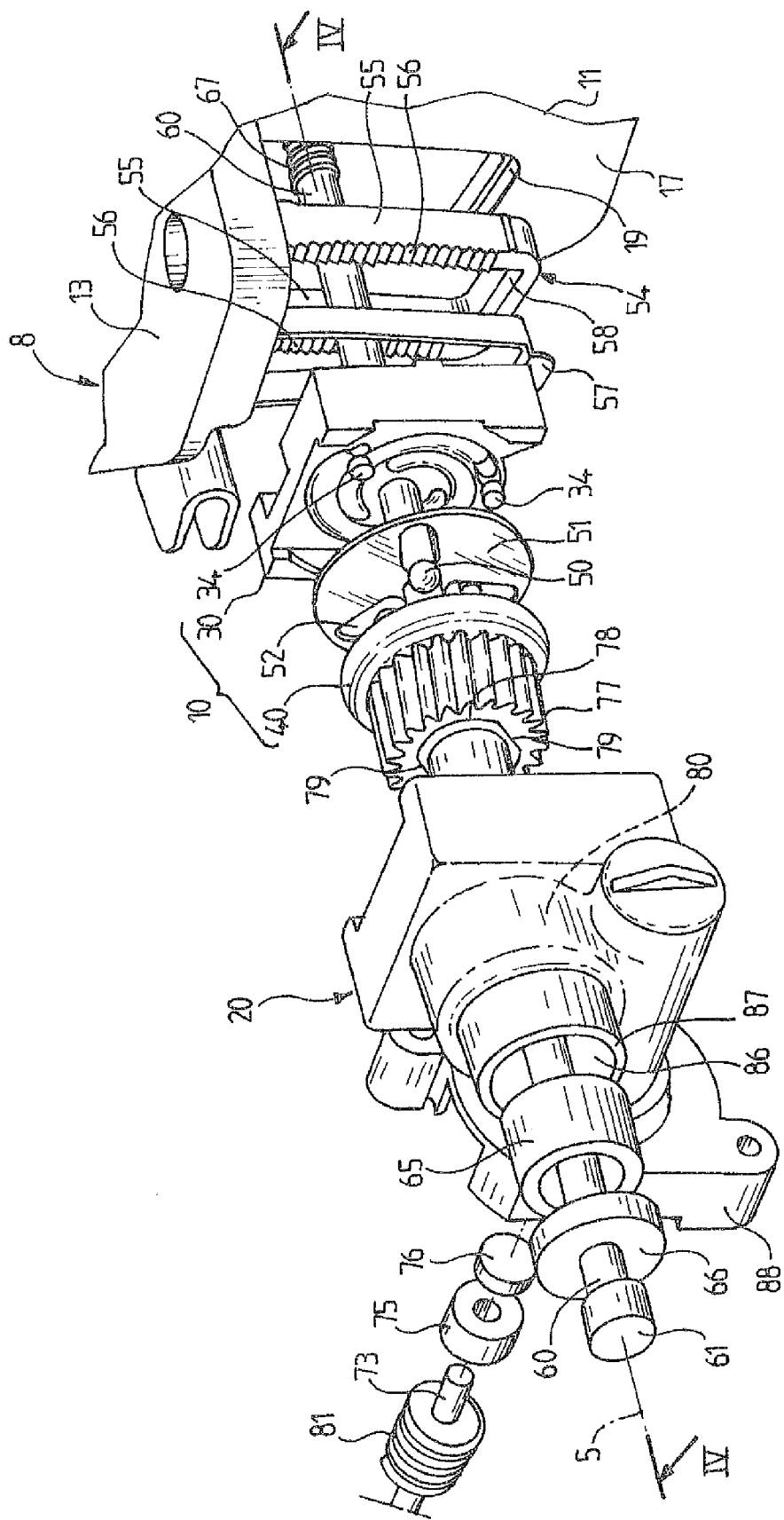
FIG. 2 is an enlarged view of FIG. 1, without the electric motor and with a single upright of the fixed support member.
Figure 4:
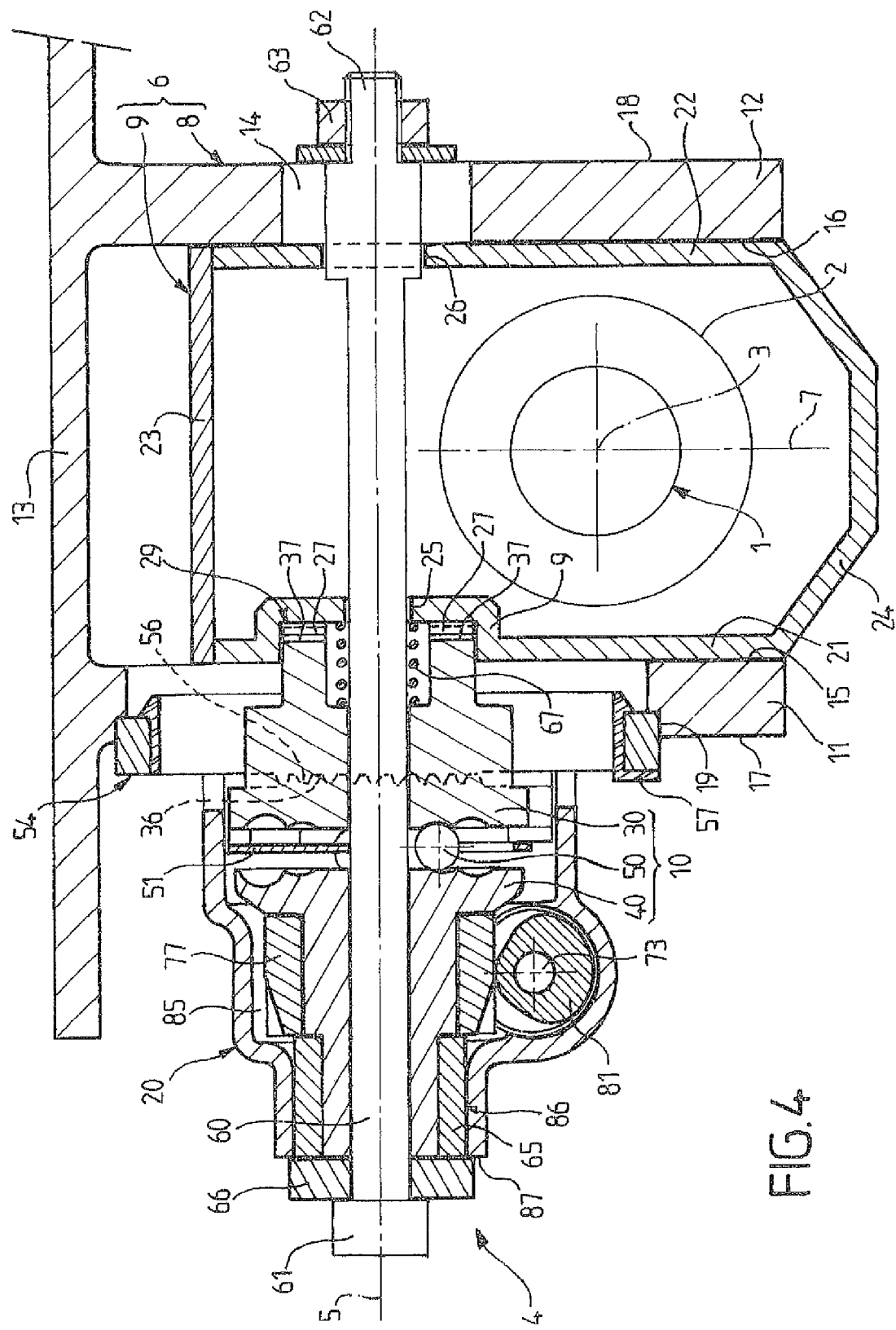
FIG. 4 is a sectional view taken along the line IV-IV of FIG. 2, the different members being assembled.

The Referring first more particularly to FIG. 4, the steering column includes a steering shaft 1 that is mounted rotatably about a steering axis 3. The steering shaft 1 is mounted in a body tube 2 located in the top part of the steering column. The steering shaft bears the steering wheel at one of its ends and is connected to the intermediary shaft of the column at its other end. FIGS. 1 and 2 are views of the side of the steering wheel, i.e. on the driver's side. The steering column is mounted in a support assembly 6 that is fastened to the structure of the vehicle.

The support assembly 6 includes a fixed support member 8 and a movable support member 9. The body tube 2 is arranged in the movable support member 9. Said body tube 2 is immobilized on the fixed support member 8 in a locked position by a clamping system 4. Said clamping system 4 provides an unlocked position of the steering column for height and depth to be adjusted. The clamping system 4 is arranged and acts along a clamping axis 5, which is substantially perpendicular to the vertical plane 7 passing through the steering axis 3.

For the height to be adjusted, the whole movable support member 9 with the body tube 2 and the clamping system 4 moves with respect to the fixed support member 8. For the depth to be adjusted, only the body tube 2 with the movable support member 9 moves with respect to the fixed support member 8, the clamping system 4 remaining stationary.

The fixed support member 8 is made up of two uprights 11 and 12, which are connected by a connecting member 13. Both uprights 11 and 12 are substantially vertical, i.e. they are substantially parallel to the vertical plane 7 passing through the steering axis. In the remainder of the description, the vertical plane will be referred to as the vertical steering plane 7. The upright 11 comprises in the vertical direction an oblong hole, which is a housing 19 for a frame 54. The upright 12 comprises an oblong hole 14 in the vertical direction. The housing 19 and the oblong hole 14 allow for the vertical clearance of the clamping system 4 for height adjusting.

In the remainder of the description and for a same member, we will use the term "internal" or "inner" with respect to the steering axis 3 or with respect to the vertical steering plane 7, anything being closest to said steering axis 3 or said steering plane 7, and the term "external" or "outer" anything being the most distant.

Thus, the upright 11 has an internal face 15 and an external face 17 with respect to the steering plane 7. Similarly, the upright 12 has an internal face 16 and an external face 18 with respect to this same steering plane 7. Said faces 15, 16, 17 and 18 are substantially parallel to the vertical steering plane 7.

The movable support member 9 is made of two uprights 21 and 22, which are connected by a connecting member 23 located at the upper part and by a closing member 24 located at the lower part. The upright 21 includes a housing 29 and an oblong hole 25 in the axial direction. The upright 22 includes an oblong hole 26 in the axial direction. The oblong hole 25 and the oblong hole 26 allow for the axial clearance of the movable support member 9 for the depth to be adjusted.

The clamping system 4 has a clamping rod 60, the axis of which is the clamping axis 5. Said clamping rod 60 passes through both uprights 11 and 12 of the fixed support member 8, and it is immobilized on the fixed support member 8 in a locked position. The electric device for clamping a steering column according to the invention is mounted in a casing 20 supporting an electric actuator 70.

The casing 20 includes a transmission mechanism 80 and an immobilizing assembly 10, which are mounted on the clamping rod 60. Said clamping rod 60 passes through the casing 20 and supports the assembly of the electric clamping device resting on both uprights 11 and 12 of the fixed support member 8.

The immobilizing assembly 10 comprises a cam 30 rotationally fixed with respect to the clamping axis 5 and a movable cam 40 rotationally movable with respect to said clamping axis 5.

The electric actuator is an electric motor 70, whose axis is referred to as the drive axis 71. The drive axis 71 is arranged in a plane 72 perpendicular to the clamping axis 5 and parallel to the vertical steering plane 7.

Figure 3:
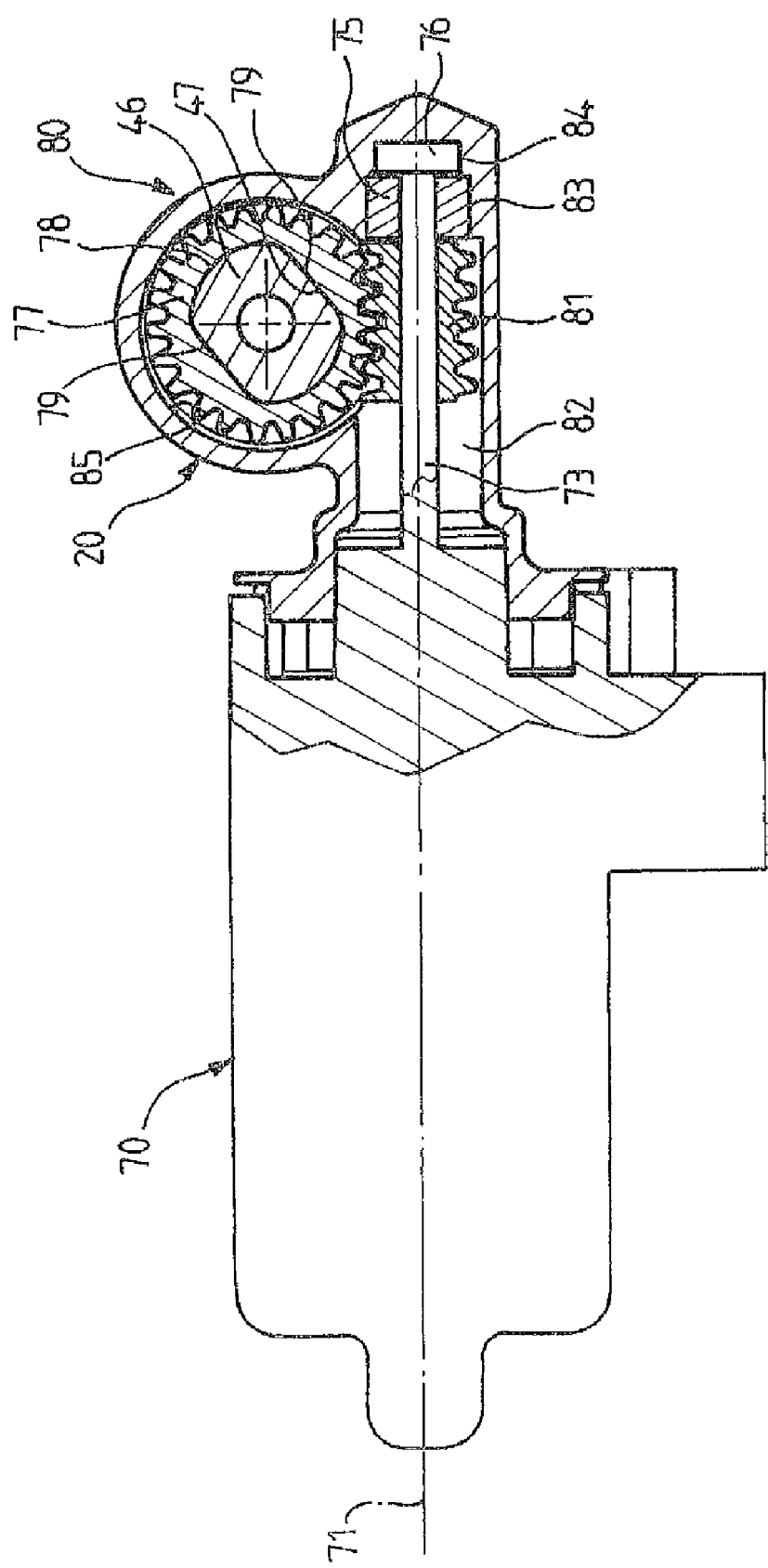
FIG. 3 is a sectional view taken along the line III-III of FIG. 1, the different members being assembled.

As is more particularly shown on FIGS. 1 and 3, the transmission mechanism 80 is a wheel and endless screw system including a pinion wheel 77 and an endless screw 81.

The endless screw 81 and the pinion wheel 77 are mounted and arranged in the casing 20. The casing 20 includes two main housing portions 82 and 85. The housing portion 82 is arranged for the endless screw 81 and it is prolonged with two housing portions 83 and 84 along the drive axis 71. The housing portion 85 is arranged for the pinion wheel 77 and it is prolonged with a housing portion 86 along the clamping axis 5.

The endless screw 81 is driven by the electric motor 70 and meshing into the wheel 77 driving the movable cam 40. The casing 20 also includes a flange 88 for mounting the electric motor 70, which includes a flange 74 fixed on said flange 88.

The electric motor 70 has a drive shaft 73 supporting and driving the endless screw 81. The drive shaft 73 is supported at its end by a self-lubricating bearing 75 arranged and mounted in the housing 83. In addition, a plastic abutment 76 is mounted on the end of the drive shaft 73 and is mounted and arranged in the housing 84.

As shown on FIGS. 1, 2, 3 and 4, the immobilizing assembly 10 is located in the clamping system 4 and includes the movable cam 40, the fixed cam 30 and one or more rolling members 50 arranged between the fixed cam 30 and the movable cam 40. The rolling members 50 are balls 50, which are held in position by a cage 51. The movable cam 40, the cage 51 with the balls 50 and the fixed cam 30 are arranged in the casing 20 and are mounted on the clamping rod 60. The pinion wheel 77 is mounted on a hub 46 of the movable cam 40. Two flat portions 47 arranged on the hub 46 cooperate with two flat portions 79 arranged in a hole 78 of the pinion wheel 77.

The clamping rod 60 includes at one of its ends an axial holding member that is made up of a head 61 directly arranged on said rod. The other end of the clamping rod 60 is a threaded end 62 onto which there is mounted an axial holding member formed by a nut 63.

On the side of the head 61, the clamping rod 60 is supported at its end by a self-lubricating bearing 65 that is arranged within the housing 86 of the casing 20. Additionally, a abutment 66 with needles is arranged on the end of the clamping rod 60. Said needle abutment 66 is arranged on an external face 87 of the casing 20, rests against the movable cam 40 and is held in position by the head 61 of the clamping rod 60. Finally, a return spring 67 is mounted on the clamping rod 60 between the fixed cam 30 and the upright 21 of the movable support member, ensuring that the device is under strain.

Thus, the clamping system 4 includes the clamping rod 60 onto which there are mounted: the needle abutment 66, the immobilizing assembly 10, the return spring 67 and the nut 63. The needle abutment 66 is arranged between the head 61 of the clamping rod 60 and the external face 87 of the casing 20. The immobilizing assembly 10 is arranged in the casing 20 and against the external face 17 of the upright 11 of the fixed support member 8. The return spring 67 is arranged between the fixed cam 30 of the immobilizing assembly 10 and the upright 21 of the movable support member 9. The nut 63 is mounted on the threaded end 62 of the clamping rod 60, and rests against the external face 18 of the upright 12 of the fixed support member 8. Moreover, the clamping rod 60 includes two flat portions 64 cooperating with the width of the oblong hole 14 provided in said upright 12 for the height adjustment.

Figure 9:
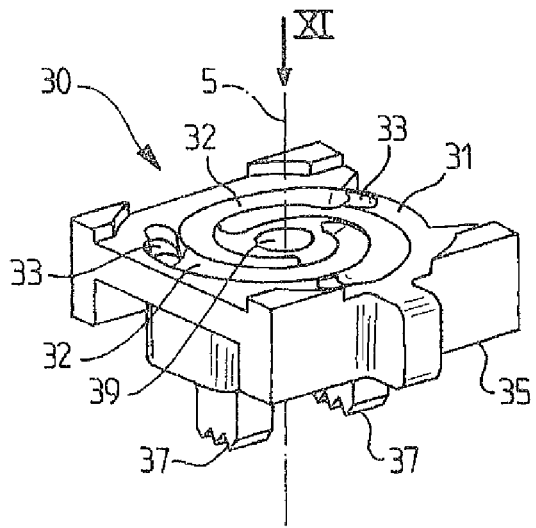
FIG. 9 is a perspective view of the fixed cam, on the side of the fixed rolling paths.
Figure 10:
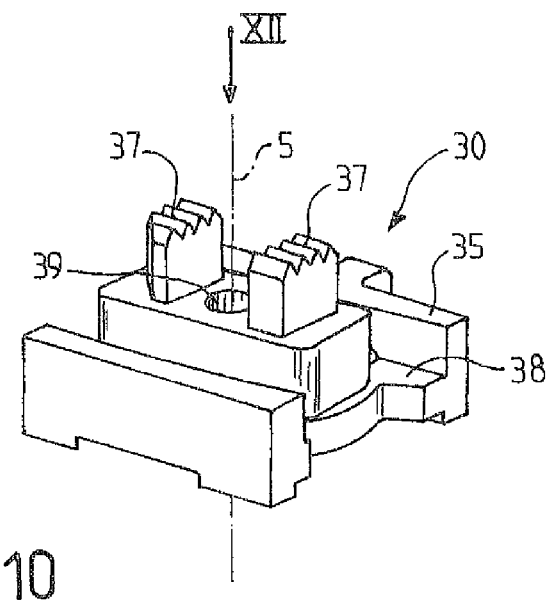
FIG. 10 is a perspective view of the fixed cam on side of the racks.
Figure 11:
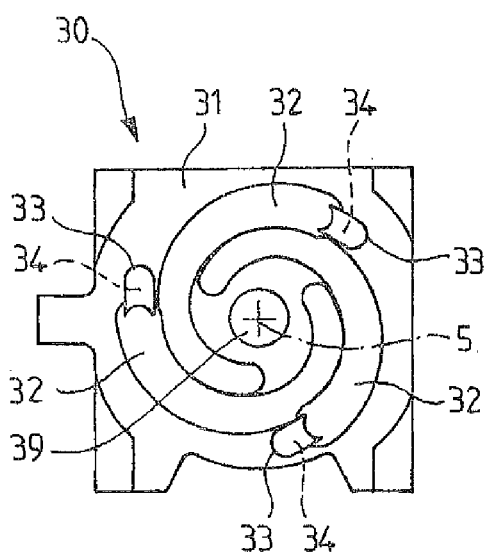
FIG. 11 is a view taken along XI of FIG. 9.
Figure 12:
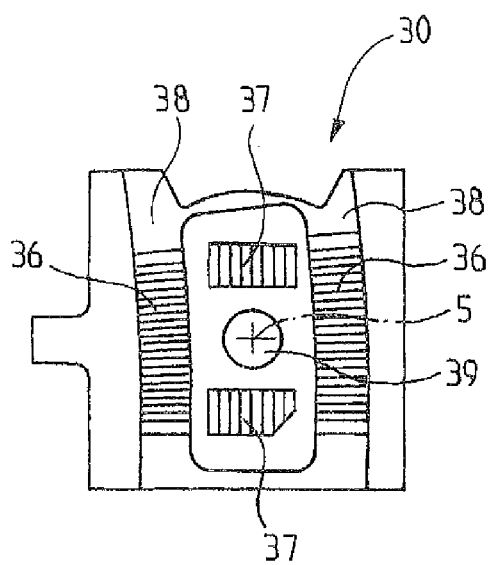
FIG. 12 is a view taken along XII of FIG. 10.

According to an essential feature of this invention, in the immobilizing assembly 10, the rolling member or the ball 50 or each rolling member or each ball 50 moves on a fixed rolling path 32 (FIG. 9) provided on the fixed cam 30 and on a movable rolling path 42 (FIG. 5) provided on the movable cam 40.

Each rolling path 32, 42 has an escape slope for the rolling member 50 or the ball 50 with respect to the corresponding cam 30, 40, so that, while rotating the movable cam 40 with respect to the fixed cam 30, both cams 30 and 40 move apart or closer one relative to the other according to the rotation direction, so as to reach the locked or unlocked position of the steering column.

According to another essential feature of this invention, the escape slope for rolling paths 32, 42 has a varying value less than the value linked with the friction coefficient for the rolling member.

According to another essential feature of this invention, each rolling path 32, 42 is a curve having a radius varying with respect to the clamping axis 5, so that when the movable cam 40 is rotating with respect to the fixed cam 30, one or more rolling paths 32, 42 never interferes with itself or the other rolling paths.

Thus, the axial movement of the movable cam 40 with respect to the fixed cam 30 is a function of the rotation of the movable cam 40 and depends, at each moment, on the position of the rolling member or the ball 50 or the rolling members 50 or the balls 50 with respect to the clamping axis 5 and of the escape slope for the rolling paths 32, 42 for said position.

According to an embodiment of this invention, the immobilizing assembly 10 includes two rolling members 50, or two balls 50, each rolling member 50 or each ball 50 moving on corresponding fixed rolling path 32 and movable rolling path 42.

According to another embodiment of this invention shown on the figures, the immobilizing assembly 10 includes three rolling members 50 or three balls 50, each rolling member 50 or each ball 50 moving on corresponding fixed rolling path 32 and movable rolling path 42.

In order to improve the operation of the electric clamping device embodying the invention, a damping member 34, 44 is provided in a housing 33, 43 arranged at the peripheral end of each of the fixed rolling paths 32 and of each of the movable rolling paths 42.

Figures 5, 8:
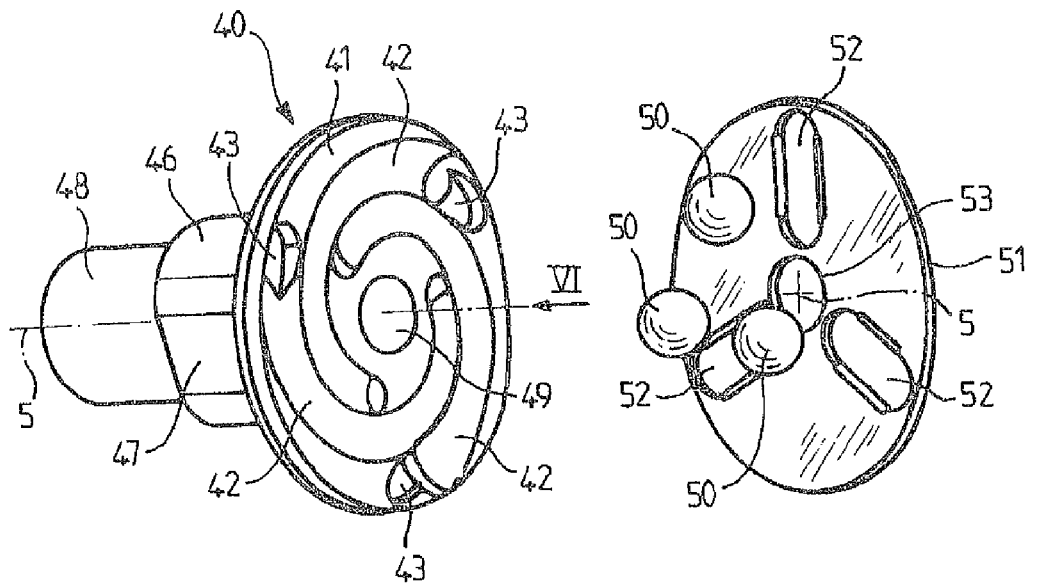
FIG. 5 is a perspective view of the movable cam.
FIG. 8 is a view similar to FIG. 6 with the balls and the cage.
Figures 6, 7:
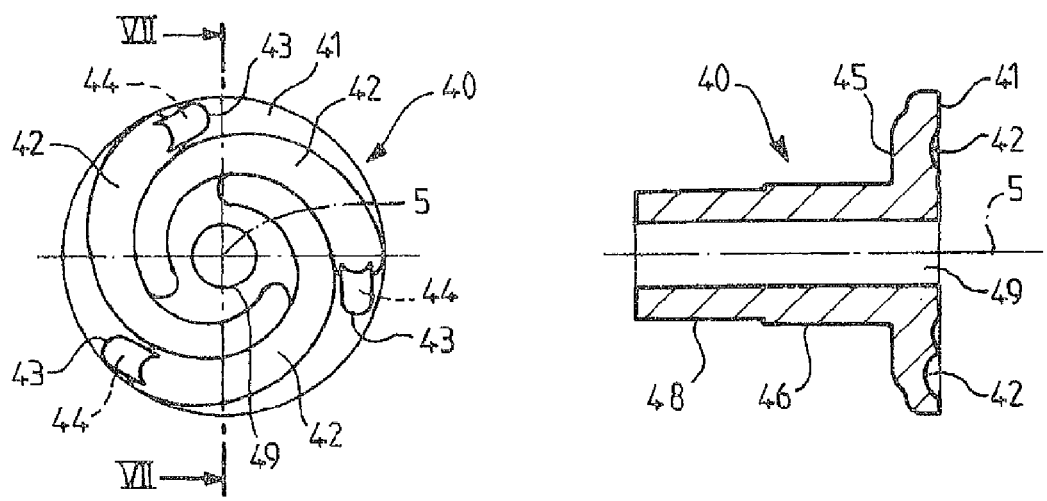
FIG. 6 is a view taken along VI of FIG. 5.
FIG. 7 is a sectional view taken along the plane VII-VII of FIG. 6.

The structure of the movable cam 40 is detailed on FIGS. 5, 6 and 7. The movable cam 40 comprises a plate that is transversal with respect to the clamping axis 5 and from which a hub 46 and a journal 48 extend. The hub 46 has two flat portions 47 in order to accommodate the wheel 77 to be mounted by means of the hole 78 and both flat portions 79. The assembly is to be mounted within the casing 20 by means of the journal 48 in the self-lubricating bearing 65. The movable cam 40 is mounted to rotate freely about the clamping rod 60 by means of a through-hole 49.

The transversal plate is perpendicular to the clamping axis 5. The transversal plate has an external face 45 resting against the pinion wheel 77, and an internal face 41 provided with three movable rolling paths 42. Each movable rolling path 42 is a curve having a radius varying with respect to the clamping axis 5, and having the shape of a spiral starting close to the clamping axis 5; the three movable rolling paths 42 are angularly offset by one hundred and twenty degrees. A damping member 44 is arranged in a housing 43 arranged in the peripheral end of each of the movable rolling paths 42. Each movable rolling path has an escape slope for the corresponding ball 50 with respect to the internal face 41. Said escape slope has a varying value that is always less than the value linked to the friction coefficient for the ball 50 that should roll without gliding.

The ball cage 51 is a transversal plate shown on FIG. 8 and mounted to rotate freely about the clamping rod 60 through a through-hole 53. The ball cage 51 has three oblong holes 52 having a radial direction and offset by one hundred and twenty degrees in order to allow for the clearance of the balls 50.

The structure of the fixed cam 30 is detailed in FIGS. 9, 10, 11 and 12. The fixed cam 30 is made up of a plate transversal with respect to the clamping axis 5 and having a rectangular shape. The fixed cam 30 is mounted to rotate freely about the clamping rod 60 through a through-hole 39. The fixed cam 30 is mounted and engaged in the casing 20.

The transversal plate is perpendicular to the clamping axis 5. The transversal plate has an internal face 35 resting against the upright 11 of the fixed support member 8, and an external face 31 provided with three fixed rolling paths 32. Each fixed rolling path 32 is a curve that has a radius varying with respect to the clamping axis 5, and that has the shape of a spiral starting close to the clamping axis 5; the three fixed rolling paths 32 are angularly offset by one hundred and twenty degrees.

A damping member 34 is arranged in a housing 33 that is arranged in the peripheral end of each of the fixed rolling paths 32. Each fixed rolling path has an escape slope for the corresponding ball 50 with respect to the external face 31. Said escape slope has a varying value that is always less than the value linked to the friction coefficient for the ball 50 that should roll without gliding.

The fixed cam 30 includes two radial racks 36 movable in height and two fixed axial racks 37. The fixed cam 30 is rotationally fixed with respect to the clamping axis 5 and axially fixed along the steering axis 3. The fixed cam 30 is movable in height for radial or height adjustment. Both movable radial racks 36 are arranged in the bottom of two notches 38 of the internal face 35 of the fixed cam 30. Both fixed axial racks 37 are arranged on two projections of the internal face 35.

The two movable radial racks 36 (FIG. 2) cooperate with two fixed radial racks 56 arranged on the two uprights 55 of a frame 54. The frame 54 is provided in the housing 19 of the upright 11 of the fixed support member. Moreover, a plastic pad 57 with the shape of a frame is engaged and fixed in said frame 54 in order to facilitate sliding in height of the fixed cam 30. Two notches 38 thus accommodate two uprights 55, which immobilize in rotation the fixed cam 30.

The two fixed axial racks 37 cooperate with two movable axial racks 27 that are arranged in the bottom of a housing 29 arranged in the upright 21 of the movable support member 9. The return spring 67 is provided in a housing of the fixed cam 30. The return spring 67 abuts between the bottom of said housing and the bottom of the housing 29.

Thus, the fixed cam 30 is engaged and rotationally immobilized in the casing 20, said fixed cam 30 being rotationally immobilized in the rack frame 54 fixed in the fixed support member 8, preventing any rotation of said casing 20 with respect to the clamping axis 5.

The kinematics of the invention is thus described hereinafter. The electric motor 70 being fixed with respect to the casing 20 drives the endless screw 81. The latter operates in couple with a toothed pinion wheel 77 in order to adapt the rotation speed of the electric motor 70 to the ball cam system. In order to compensate for the transversal and axial stresses, in the endless screw 81, due to the operation of the reducer, a self-lubricating bearing 75 is integrated into the casing 20 as well as a plastic abutment 76. The endless screw 81 transmits the power of the electric motor 70 to the toothed wheel 77 that is integral with the movable cam 30. For the same reasons as those described hereinabove, a self-lubricating bearing 65 guides in rotation the movable cam 30. The movable cam 30 operates in couple with the fixed cam 40; the cams are separated by the balls 50. When rotating, the movable cam 30 drives the balls 50 on the rolling paths 32 and 42, thus compelling the fixed cam 40 to move axially. This axial movement allows the column to be locked. In order to keep the balls 50 synchronized, a ball cage 51 is necessary. Locking of the column occurs as the movable cam 30 prevents the axial movement of the needle abutment 66 having as a function to prevent any movement of the clamping rod 60 while allowing for the rotation of the movable cam 30. The ball cam system increases its axial thickness thereby constraining the members of the column to become clamped therebetween in order to lock the possibility to adjust the column.

What is claimed is:

1. An electric clamping arrangement for use in combination with the adjustable steering column of an automotive vehicle including a steering shaft rotatably mounted about a steering axis in a body tube, said steering column being mounted in a support assembly including a fixed support member made up of two uprights and a connecting member, and a movable support member in which said body tube is arranged, said clamping arrangement comprising:

(a) a clamping rod extending along a clamping axis that is substantially normal to a vertical steering plane passing through said steering axis and passing through said two uprights of said fixed support member; and (b) immobilizing means mounted on said clamping rod for immobilizing said body tube in a locked position relative to said fixed support member, said immobilizing means including;

(1) a fixed cam rotationally fixed with respect to said clamping axis and having a rolling path, (2) a movable cam rotationally movable with respect to said clamping axis and having a rolling path, and (3) at least one ball arranged for rolling contact between said fixed and movable cam rolling paths;

(4) each of said rolling paths having an escape slope for said ball with respect to the corresponding cam, whereby upon rotation said movable cam with respect to said fixed cam according to a given rotational direction, said fixed cam and said movable cam are displaced relative to each other as a function of said rotational direction, thereby to produce one of said locked and unlocked conditions of said steering column:

(5) the escape slopes of said rolling paths having a varying value less than a value linked to the friction coefficient of said rolling member;

(6) each of said rolling paths extending along a curve having a radius varying with respect to said clamping axis, such that the distance between said ball and said clamping axis varies along said rolling paths;

(c) said movable cam being axially displaceable relative to said fixed cam as a function of the rotation of said movable cam and the position of said ball with respect to said clamping axis and said rolling path escape slopes.

2. A clamping arrangement as defined in claim 1, wherein said fixed cam has at least two spaced rolling paths and said movable cam has at least two corresponding rolling paths, and at least two balls respectively mounted between said rolling paths, whereby upon rotating said movable cam with respect to said fixed cam, each pair of spaced cooperating rolling paths never interfere with the other pair of cooperating rolling paths.

3. A clamping arrangement as defined in claim 1, wherein said fixed cam has three spaced rolling paths and said movable cam has three corresponding rolling paths, and three balls arranged between and in engagement with said corresponding rolling paths, respectively, whereby upon rotating said movable cam with respect to said fixed cam, each pair of cooperating rolling paths never interfere with the other two pairs of cooperating rolling paths.

4. A clamping arrangement as defined in claim 1, wherein said immobilizing means includes a cage located between said fixed cam and movable cam for maintained in place said ball.

5. A clamping arrangement as defined in claim 1, wherein said immobilizing means includes damping members respectively arranged in housings in ends of said rolling paths on the periphery of said fixed cam and movable cam.

6. A clamping arrangement as defined in claim 1, and further including:
(d) a casing supporting an electric actuator and including a transmission mechanism, said immobilizing means and said clamping rod passing through said two uprights of said fixed support member.

7. A clamping arrangement as defined in claim 6, wherein:
(1)—said electric actuator comprises an electric motor having an axis located in a plane perpendicular to said clamping axis and parallel to said vertical steering plane; and
(2)—said transmission mechanism includes a pinion wheel and an endless screw mounted in said casing, said endless screw being driven by said electric motor and meshed into said pinion wheel integral with said movable cam mounted on said clamping rod.

8. A clamping arrangement as defined in claim 7, wherein said electric motor has a shaft driving said endless screw, said shaft having an end supported by a self-lubricating bearing located in said casing.

9. A clamping arrangement as defined in claim 8, wherein said casing contains a plastic abutment arranged at said end of said shaft.

10. A clamping arrangement as defined in claim 7, wherein the immobilizing means includes a cage located between said fixed cam and said movable cam for maintaining in place said ball, said movable cam, said cage and said fixed cam being arranged within said casing and mounted on said clamping rod, said pinion wheel being mounted on a hub of said movable cam and rotationally integral with said hub by a flat portion arrangement of said hub and said pinion wheel.

11. A clamping arrangement as defined in claim 10, wherein said clamping rod has an end supported by a self-lubricating bearing arranged in said casing.

12. A clamping arrangement as defined in claim 11, wherein said clamping rod includes a head; and further including a needle abutment located on said end of said clamping rod between an external face of said casing and said movable cam and said clamping rod head.

13. A clamping arrangement as defined in claim 12, and further including a return spring located on said clamping rod between said fixed cam and said movable support member for holding said clamping arrangement under constraint.

14. A clamping arrangement as defined in claim 13, wherein
said needle abutment is mounted on said clamping rod between said clamping rod head and said casing; wherein said immobilizing means is arranged in said casing against an external face of one of said fixed support member uprights; and wherein said return spring is located between said fixed cam and said movable support member; and a nut mounted on a threaded end of said clamping rod, and resting against the external face of the other upright of said fixed support member; said clamping rod having two flat portions cooperating with the width of an oblong hole provided in said other upright for height adjustment of said steering column.

15. A clamping arrangement as defined in claim 14, wherein
said fixed cam includes two vertically movable radial racks arranged in the bottom of two notches of said fixed cam, and two fixed axial racks; and further including a frame mounted in said one of said fixed support member uprights, said frame including two uprights and two fixed radial racks on said two uprights, said two movable radial racks cooperating with said two fixed radial racks on the uprights of said frame; and said two fixed axial racks of said fixed cam cooperating with two movable axial racks arranged on an upright of said movable support member, said two notches of said fixed cam accommodating said two uprights of said frame; and a plastic pad fixed in said frame for making sliding movement of the components easier.

16. A clamping arrangement for immobilizing in a locked condition the body tube of an adjustable steering column relative to a fixed support member of an automotive vehicle, comprising:
(a) a clamping rod extending along a clamping axis; and
(b) immobilizing means mounted on said clamping rod, including:
(1) a fixed cam rotationally fixed with respect to said clamping axis and having a number N of spaced rolling paths greater than one;
(2) a movable cam rotationally movable with respect to said clamping axis and having N rolling paths corresponding with said N rolling paths of said fixed cam;
(3) at least N balls arranged between pairs of cooperating rolling paths of said fixed cam and said movable cam, respectively;
(4) each of said rolling paths having an escape slope for said balls with respect to the corresponding cam, whereby upon rotating said movable cam with respect to said fixed cam according to a rotation direction, said fixed cam and said movable cam are displaced relative to each other as a function of said rotation direction, thereby to produce one of locked and unlocked conditions of said steering column;
(5) the escape slopes of said rolling paths having a varying value less than a value linked to the friction coefficient for said balls,
(6) each of said rolling paths extending along a curve having a radius varying with respect to said clamping axis, such that the rolling paths of said fixed cam angularly overlap but never interfere with another of said rolling paths of the fixed cam and such that the rolling paths of said movable cam angularly overlap but never interfere with another of said rolling paths of the movable cam;

(c) said movable cam being axially displaceable relative to said fixed cam as a function of a rotation of said movable cam and a position of said ball with respect to said clamping axis and said escape slopes of said rolling paths for said ball position.

17. A clamping arrangement as defined in claim 16, where N equals two.

18. A clamping arrangement as defined in claim 16, where N equals three.

19. A clamping system for immobilizing in a locked position relative to a fixed support member a body tube in which an adjustable steering column of an automotive vehicle is received, said clamping system including:
   (a) a clamping rod extending along a clamping axis; and
   (b) immobilizing means mounted on said clamping rod and including:
      (1) a fixed cam rotationally fixed with respect to said clamping axis and having a rolling path;
      (2) a movable cam rotationally movable with respect to said clamping axis and having a rolling path: and
      (3) at least one ball arranged in engagement between said rolling path of said fixed cam and said rolling path of said movable cam;
      (4) each of said rolling paths having an escape slope for said ball with respect to the corresponding cam, whereby while rotating said movable cam with respect to said fixed cam according to a given rotational direction, said fixed cam and said movable cam are displaced relative to the other as a function of said rotation direction, so as to reach one of locked and unlocked positions of said steering column;
      (5) the escape slopes of said rolling paths having a varying value less than a value linked to the friction coefficient for said ball,
      (6) each of said rolling paths extending along a curve having a radius varying with respect to said clamping axis;
   (c) said movable cam being axially displaceable relative to said fixed cam as a function of the rotation of said movable cam and a position of said ball with respect to said clamping axis and said escape slopes of said rolling paths for said ball position.

* * * * *